United States Patent [19]
Kemner

[11] Patent Number: 5,961,560
[45] Date of Patent: Oct. 5, 1999

[54] SYSTEM AND METHOD FOR MANAGING ACCESS OF A FLEET OF MOBILE MACHINES TO A SERVICE RESOURCE

[75] Inventor: Carl A. Kemner, Peoria, Ill.

[73] Assignee: Caterpillar Inc., Peoria, Ill.

[21] Appl. No.: 08/781,889

[22] Filed: Dec. 19, 1996

[51] Int. Cl.[6] .................................................. G06F 165/00
[52] U.S. Cl. ............................ 701/24; 701/50; 395/859
[58] Field of Search .................................. 701/24, 29, 30, 701/32, 50; 340/989, 991, 992, 993, 994; 395/859

[56] References Cited

U.S. PATENT DOCUMENTS

| | | | |
|---|---|---|---|
| 4,950,118 | 8/1990 | Mueller et al. | 414/274 |
| 5,390,125 | 2/1995 | Sennott et al. | 364/449 |
| 5,445,347 | 8/1995 | Ng | 246/169 |
| 5,586,030 | 12/1996 | Kemner et al. | |

Primary Examiner—William A. Cuchlinski, Jr.
Assistant Examiner—Arthur D. Donnelly
Attorney, Agent, or Firm—W. Bryan McPherson

[57] ABSTRACT

The invention is a system and method for managing a service resource by a fleet of mobile machines. Each of the mobile machines has a queue manager adapted to generate a queue position request signal as the mobile machine approaches the service resource. A service manager is on each mobile machine, and is adapted to generate a service request signal in response to a condition of the mobile machine. A resource manager is adapted to establish and control a queue to control access to the resource in response to receiving a queue request position signal. The resource manager is also adapted to receive a service request signal, and responsively determine when to allow the mobile machine to access the service resource based on a condition of each of the mobile machine in the fleet.

29 Claims, 4 Drawing Sheets

SYSTEM AND METHOD FOR MANAGING ACCESS OF A FLEET OF MOBILE MACHINES TO A SERVICE RESOURCE

TECHNICAL FIELD

This invention relates generally to a system and method for managing a service resource in a mobile machine system and, more particularly, to a system and method for managing access to a service resource having a service center with at least one service point.

BACKGROUND ART

Caterpillar Inc. of Peoria, Ill., manufactures off-road mining mobile machines. For example, the Caterpillar 777C is an off-road mining truck. In commonly owned U.S. Pat. No. 5,390,125, Kyrtsos et al disclose an autonomous mobile machine system for use with a mining mobile machine such as a 777C truck. Such an autonomous mobile machine system may be used, for example, to implement an autonomous mining operation. For example, a plurality of autonomous dump trucks can haul rock from an excavation site to a crusher site in an open pit mining operation.

In addition, in commonly owned U.S. Pat. No. 5,586,030, Kemner et al disclose a system using a queuing technique to manage a single input, fixed position resource such as a wheel loader. In Kemner's system, a fleet of mobile machines access the fixed resource as part of a scheduled routine, being controlled by the queuing technique in an orderly fashion.

However, the mobile machines require routine service and both scheduled and unscheduled maintenance at irregular times. It is often not feasible or efficient for a mobile machine to approach a service area as it initially senses the need for service. A more complex queue control system is needed to bring mobile machines in for service and maintenance in a manner that keeps the overall work site operating smoothly and efficiently.

The present invention is directed to overcoming one or more of the problems as set forth above.

DISCLOSURE OF THE INVENTION

In one aspect of the present invention a system for managing a service resource shared by at least one mobile machine is provided. The system includes a queue manager on each mobile machine. The system also includes a service manager on each of the mobile machines adapted to generate a service request signal in response to a condition of the mobile machine. The system also includes a resource manager adapted to establish and control access to the service resource, and being adapted to receive the service request signal and allow the mobile machine to access the service resource as a function of the condition of each of the mobile machines.

In another aspect of the present invention, a method for managing a service resource shared by at least one mobile machine is provided. The method includes the steps of establishing and controlling a queue to control access to the service resource, and determining to allow a mobile machine to access the service resource.

BEST MODE FOR CARRYING OUT THE INVENTION

Figure 1:
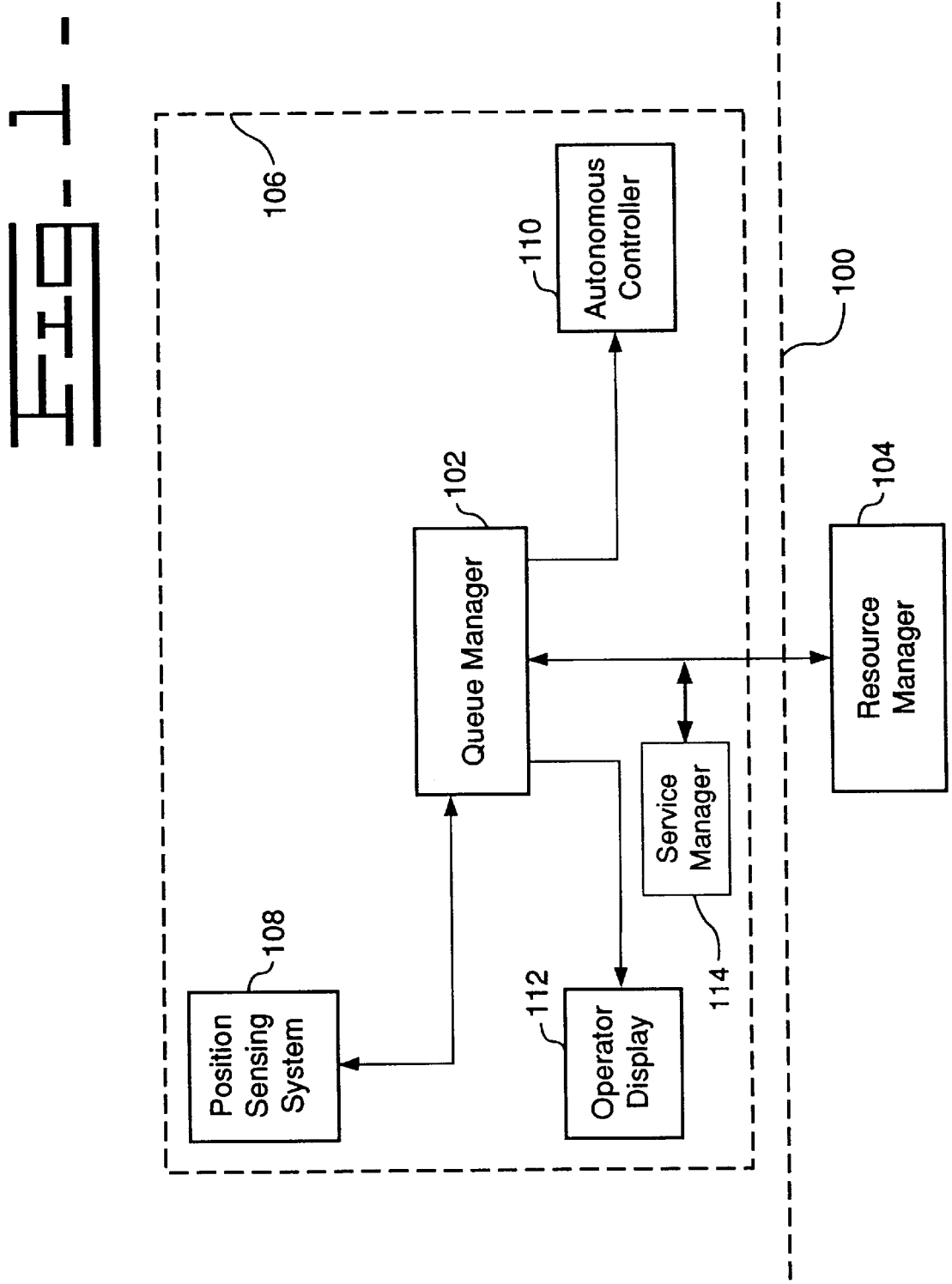
FIG. 1 is a high level block diagram illustrating an embodiment of the present invention.
Figure 2:
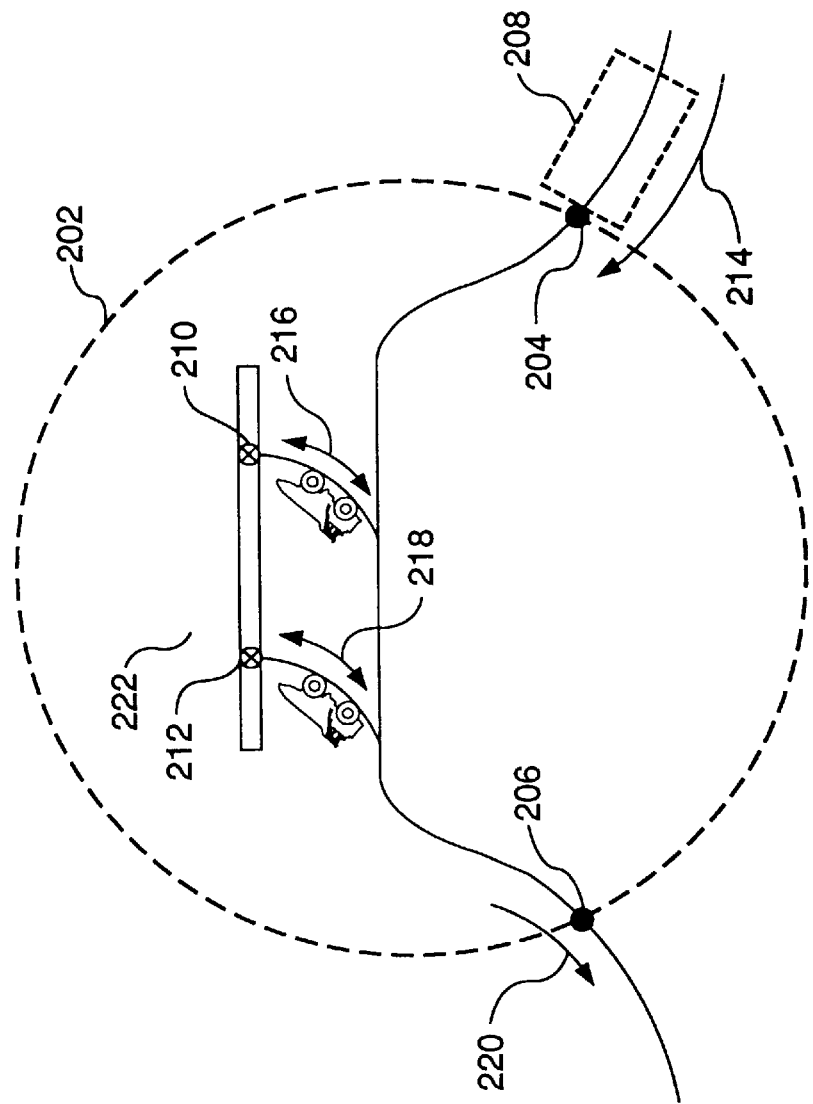
FIG. 2 is a diagrammatic illustration of a service resource having one entry point, one exit point, one service center, and two service points.

With reference to FIGS. 1 and 2, the present invention provides a system 100 for managing a service resource 202 shared by at least one mobile machine 106. The resource 202 has an entry point 204, an exit point 206, and a service center 222. The service center has at least one service point 210, 212. A resource manager 104 enables a mobile machine 106 to access the service resource 202 based on a condition of the mobile machine 106 with respect to the condition of other mobile machines.

A queue manager 102 is located on each mobile machine 106. The queue manager 102 generates a queue position request signal when the mobile machine 106 approaches the resource 202.

A service manager 114 is located on each mobile machine 106. The service manager 114 generates a service request signal in response to a condition on the mobile machine 106.

The resource manager 104 establishes and controls a queue to control access to the resource 202 in response to receiving the queue position request signal. The resource manager 104 receives the service request signal and allows the mobile machine 106 to access the service resource as a function of a condition of each of the mobile machines.

A position sensing system 108 determines the position of a predetermined point on the mobile machine 106. The position sensing system 108 may include a Global Positioning System (GPS), a laser positioning system, an inertial navigation unit, or any suitable system or combination thereof.

The system 100 may operate in an autonomous or manual mode. In the autonomous system embodiment, an autonomous controller 110 receives signals from the position sensing system 108 and the queue manager 102 and autonomously operates the mobile machine 106 along a predetermined path. In the manual system embodiment, an operator display 112 displays information to assist an operator during operation of the mobile machine 106.

In the preferred embodiment, the resource 202 has a service center 222. The resource manager 104 controls the flow of mobile machines, such as dump trucks, through the service resources at a work site such as an open pit mining site. The resource manager 104 acts like a supervisor, controlling access to the service resource 202, and tracking the progress of mobile machines as they pass through the service resource 202. In the preferred embodiment, the resource manager 104 is located at a base station (not shown) near an open pit mining site, and is a general purpose computer or workstation. The features of the resource manager 104 are embodied in software programmed into the computer.

With reference to FIG. 2 in the preferred embodiment, the service resource 202 includes a service center 222, and the service center 222 has multiple service points 210, 212. The service resource 202 has an entry point 204 and an exit point 206. Arrows 214, 216, 218, 220 indicate the direction of travel of mobile machines through the service resource 202.

As a mobile machine 106 performs its task within a open pit mining operation, the service manager 114 is monitoring the operating parameters of the mobile machine 106. The operating parameters are sent, via a service request signal, to the resource manager 104 and define a condition of the mobile machine 106. When the resource manager 104 receives the service request signal, it determines when to allow the mobile machine 106 to approach the service resource 202 based on the condition of the mobile machine 106 as compared to the condition of each of the other mobile machines operating at the open mine operation. The resource manager 104 schedules the mobile machine 106 to approach the service resource 202 at an optimal time.

The resource manager 104 establishes a queue 208 for the entry point 204 to the service resource 202. As a mobile machine 106 approaches the service resource 202, the resource manager 104 assigns the mobile machine 106 a position within the queue 208.

When a mobile machine 106 approaches the service resource 202 it requests a position within the queue 208 located at the entry point 204. The resource manager 104 responds with a queue position for the approaching mobile machine 106.

When the service center 222 is ready to receive another mobile machine 106 the resource manager 104 selects the mobile machine 106 in the first position of the queue 208 and determines the appropriate service point 210, 212 to send it to. The resource manager 104 then determines when the route to the service point 210, 212 is clear. The timing of the access of the service center 222 is important to ensure that multiple mobile machines do not conflict with each other as they move through the service resource 202. The resource manager 104 then sends the mobile machine 106 to the appropriate service point 210, 212. The resource manager 104 is able to send multiple mobile machines 106 to the service center 222 to simultaneously access the service center 222. Specifically, a first and second mobile machine 106A, 106B, can be located at separate service points 210, 212 respectively, and simultaneously be serviced.

When the mobile machine 106 has completed being serviced, it sends a signal to the resource manager 104 indicating that service is complete. The resource manager 104 then sends a command to the mobile machine 106 to leave the service resource 202. The mobile machine 106 then leaves the service resource 202 via the exit point 206. Once the mobile machine 106 has left the resource 202, the resource manager 104 selects the next appropriate mobile machine 106 in the queue 216 to allow access to an available service point 210, 212 at the service center 222.

Figure 3:
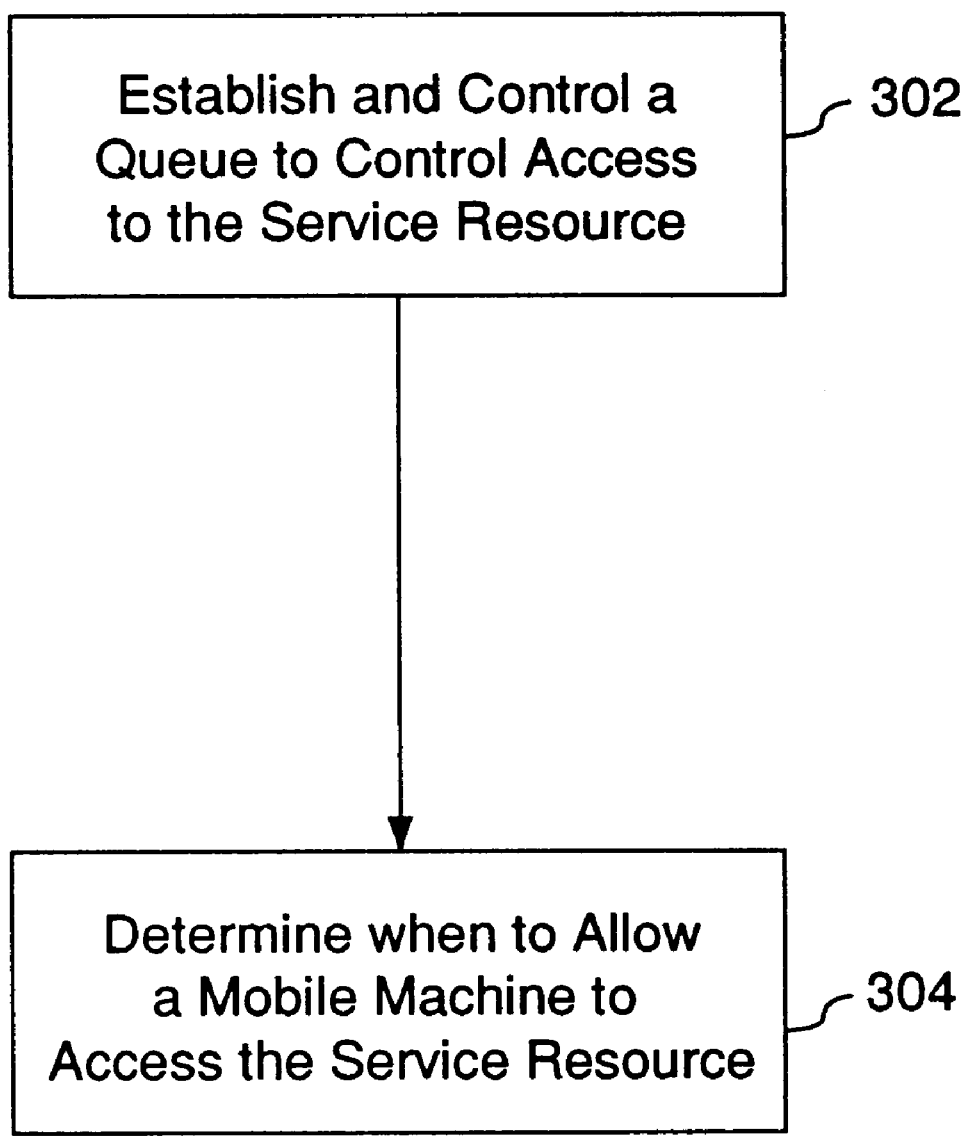
FIG. 3 is a high level flow diagram illustrating a method of the present invention.

A method of managing a service resource 202 according to one embodiment of the present invention is illustrated in FIG. 3. In a first control block 302, the resource manager 104 establishes and controls a queue 208, corresponding to the entry point 204, in order to control access to the service resource 202. In a second control block 304, the resource manager 104 determines to allow a mobile machine 106 to access the service resource 202 as a function of a condition of each of the mobile machine 106.

Industrial Applicability

With reference to the drawings and in operation, the present invention provides a system and method for managing access to a service resource 202. The service resource 202 has a service center 222, an entry point 204, and an exit point 206. In the preferred embodiment, during initialization, the resource manager 104 accesses a database containing the information regarding the configuration of the service resource 202. For example, referring again to FIG. 2, the resource manager 104 determines the service resource 202 contains one service center 222, one entry point 204, one exit point 206, and two service points 210, 212. Based on this information, the resource manager 104 establishes a queue 208 for the entry point 204. The purpose of the queue 208 is to control access to the service resource 202.

As a mobile machine 106A performs its task within an open pit mining site, the service manager 114 on the mobile machine 106A monitors the operating parameters of the mobile machine 106A. These operating parameters can include routine service parameters such as fuel level, oil pressure, and oil quality, or complex parameters such as engine diagnostics and strut diagnostics. These operating parameters are sent, via a service request signal, to the resource manager 104 to indicate a condition of the mobile machine 106A. The service request signal also includes information concerning the task the mobile machine 106A is currently performing. When the resource manager 104 receives the service request signal, it determines when to allow the mobile machine 106A to approach the service resource 202. This decision is based on the condition of the mobile machine 106A compared to the condition of each of the other mobile machines operating at the open mine operation.

For example, a mobile machine 106 carrying material from a loader (not shown) to a crusher (not shown), may be able to make twenty round trips before needing to refuel. As the resource manager 104 receives the periodic updates for the mobile machine 106 via the service request signal, the resource manager 104 determines that, based on the task the mobile machine 106 is performing and the current fuel level, the mobile machine 106 can make at most four more round trips between the loader and crusher before requiring refueling. The resource manager 104 then begins to determine the optimal time to allow the mobile machine 106 to access the service resource 202. For example, four mobile machines are currently in the queue 208 at the service resource 202, waiting to be serviced. Barring an unexpected service problem by another mobile machine, by the time the mobile machine 106 completes two more round trips between the loader and crusher that the queue 208 will only have one mobile machine waiting to be serviced. In this case it is more efficient, and just as effective to have the mobile machine 106 make the extra two trips before going and getting fueled at the service resource 202.

The resource manager 104 can make this determination based on a site specific service scheduling strategy. This strategy can take into account the operating parameters and current task of the mobile machine 106, the operating parameters and current task of the other mobile machines operating at the open pit mining site, and the service needs of the mobile machines currently in the service resource 202.

The resource manager 104 determines when to allow the mobile machine 106A to access the service resource 202, and then informs the mobile machine 106A when to approach the service resource 202. As a mobile machine 106 approaches the service resource 202, the queue manager 102 sends a queue position request signal to the resource manager 104. The resource manager 104 determines and sends a queue position signal to the mobile machine 106A. The queue position signal will contain information concerning the physical location of the first position in the queue 208, e.g., the entry point 204 in the queue 208, and the number of mobile machines currently in the queue 208. The queue manager 102 on the mobile machine 106A will use the information contained in the queue position signal to determine where to stop the mobile machine 106A to await further instructions from the resource manager 104.

The resource manager 104 then determines when a service point 210, 212 is available. A service point 210, 212 is available when a previous mobile machine 106 has left the service point 210, 212. The resource manager 104 tracks the progress of mobile machines in the service resource 202 by a series of communications which will be described below.

Once the resource manager 104 determines that a service point 210, 212 is available, the resource manager 104 checks to make sure the route to the service point 210, 212 is clear. Once the resource manager 104 determines that the service point 210, 212 is clear, the resource manager 104 sends a depart queue position signal to the mobile machine 106A in the first position of the queue 208. The depart queue position signal contains the location of the service point 210, 212 that the mobile machine 106A is to access. Upon receiving the depart queue position signal, the mobile machine 106A responsively sends a leave queue position signal to the resource manager 104 and moves to the service point 210, 212. Once the resource manager 104 receives the leave queue position signal from the mobile machine 106A, it updates the positions of any remaining mobile machines in the queue 208. For example, a mobile machine 106B in a second position in the queue 208 moves to the first position, and so forth.

The resource manager 104 may now determine if any other service points are available for access. In this embodiment, with two service points 210, 212, the resource manager 104 sends the next mobile machine 106B in the first position of the queue 208 to access the service point 212 not being accessed by the first mobile machine 106A.

After arriving at the service point 210 the mobile machine 106A sends an arrive signal to the resource manager 104. When the resource manager 104 receives the arrive signal, it determines the route to the second service point 212 is clear. When the second service point 212 is available, the resource manager 104 will check to make sure the route is still clear, and then send the mobile machine 106B in the first position of the queue 208 to access the second service point 212. Due to the nature of the service center, if the first and second mobile machine 106A, 106B reach their respective stop points 210, 212, at the same time, they may simultaneously access the service center 222.

Once a mobile machine 106A has finished being serviced at the service center 222, it sends a service complete signal to the resource manager 104. The resource manager 104, will check to see if the route from the service point 210, 212 to the exit point 206 is clear. When the route is clear, the resource manager 104 will send a depart service point signal to the mobile machine 106A. The depart service point signal will contain a route to take to exit the resource 202 via the exit point 206. The mobile machine 106 responsively sends a leave service point signal to the resource manager 104, and then leaves the service point 210, 212. When the mobile machine 106A exits the service resource 202, it sends a leave resource signal to the resource manager 104.

When the resource manager 104 receives the leave service point signal from the mobile machine 106A, it repeats the process of sending a mobile machine 106 to access the available service point 210, 212.

Figure 4:
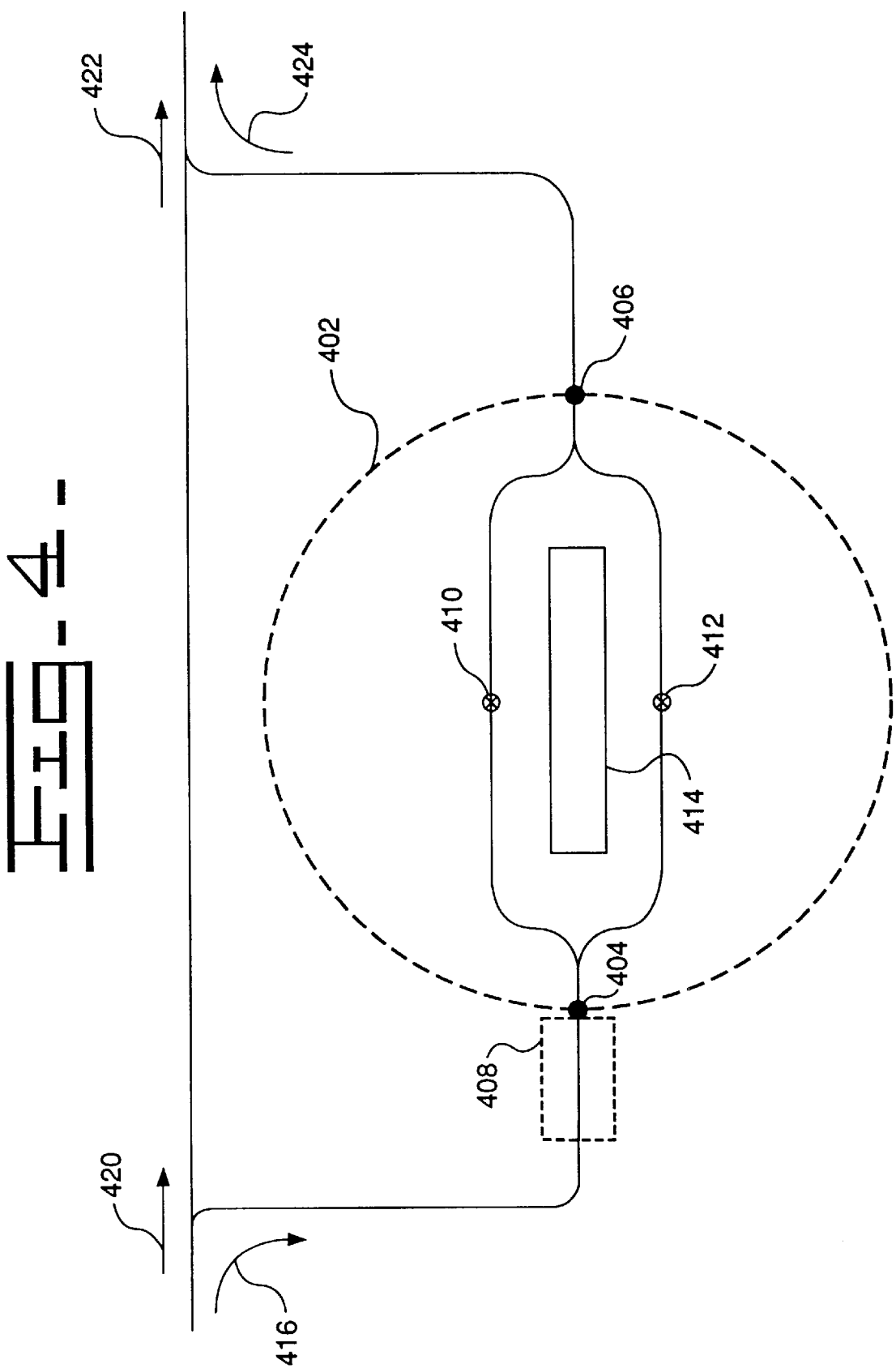
FIG. 4 is a diagrammatic illustration of a service resource having one entry point, one exit point, one fuel center, and two service points.

The present invention may be used to manage resources having service centers, or remote resources having only a fuel island. For example, the service resource 402 of FIG. 4 has a fuel island 414 which has two service points 410, 412, one entry point 404, one exit point 406, and one queue 408. Arrows 416, 418, 420, 422 show the flow of traffic. The configuration of the resource 402 will enable mobile machines to access a fuel center 414 which may be on their normal path, as opposed to going to a more remote full service resource as shown in FIG. 2.

While the invention has been particularly shown and described with reference to several preferred embodiments thereof, it will be understood by those skilled in the art that various changes in form and details may be made therein without departing from the spirit and scope of the invention.

Other aspects, objects, and features of the present invention can be obtained from a study of the drawings, the disclosure, and the appended claims.

I claim:

1. A system for managing a service resource shared by at least one mobile machine, said service resource comprising:

a queue manager located on each of said at least one mobile machine, said queue manager generating a queue position request signal in response to one of said at least one mobile machine approaching said service resource;

a service manager located on each of said at least one mobile machine, said service manager generating service request signal in response to a condition of said mobile machine; and a resource manager establishing and controlling a queue to control access to said service resource, said resource manager receiving said queue position request signal, said resource manager receiving said service request signal and allow said at least one mobile machine to access said service resource as a function of said condition of each of said at least one mobile machine.

2. A system, as set forth in claim 1, wherein said resource manager determining a configuration of said service resource.

3. A system, as set forth in claim 2, wherein said configuration of said service resource includes at least one entry point and at least one exit point.

4. A system, as set forth in claim 1, wherein said service request signal is generated in response to at least one parameter of said at least one mobile machine.

5. A system, as set forth in claim 1, wherein said service request signal includes data disclosing said condition of said mobile machine.

6. A system, as set forth in claim 1, wherein said service request signal includes data disclosing a current task of said mobile machine.

7. A system, as set forth in claim 1, wherein said determination to allow said at least one mobile machine access to said service resource is determined by a service scheduling strategy.

8. A system, as set forth in claim 7, wherein said determination to allow said at least one mobile machine access to said service resource includes assigning a priority to each of said mobile machines.

9. A system, as set forth in claim 1, wherein said resource manager to generating an access service resource signal and communicate said access service resource signal to said service manager.

10. A system, as set forth in claim 9, wherein said service manager receiving said access service resource signal.

11. A system, as set forth in claim 10, wherein said access service resource signal includes data disclosing when to access said service resource.

12. A system, as set forth in claim 1, wherein said resource manager determining a queue position in response to receiving said queue position request signal and communicating said queue position to said approaching mobile machine.

13. A system, as set forth in claim 1, wherein said resource manager delivering a queue position signal to said approaching mobile machine, said queue position signal including data disclosing the location of at least one entry point and a determination of a number of mobile machines in said queue, and wherein said queue manager determining said queue position in response to said queue position signal.

14. A system, as set forth in claim 1, wherein said resource manager selectively delivers a blocking signal to prevent mobile machines in said queue from accessing said service resource.

15. A method for managing a service resource shared by at least one mobile machine, including the steps of:
  establishing and controlling a queue to control access to said service resource; and
  determining to allow one of said at least one mobile machine to access said service resource as a function of a condition of each of said mobile machine.

16. A method, as set forth in claim 15, including the step of determining a configuration of said service resource.

17. A method, as set forth in claim 16, wherein determining said configuration includes the step of determining at least one entry point, and at least one exit point.

18. A method, as set forth in claim 15, including the step of generating a service request signal in response to a condition of said at least one mobile machine.

19. A method, as set forth in claim 15, including the step of receiving a service request signal from one of said at least one mobile machine.

20. A method, as set forth in claim 15, wherein said service request signal includes data disclosing a condition of said mobile machines.

21. A method, as set forth in claim 15, wherein the step of determining to allow one of said at least one mobile machines to access said service resource is performed by a service scheduling strategy.

22. A method, as set forth in claim 15, including the step of generating a access service resource signal and communicating said signal to said at least one mobile machines.

23. A method, as set forth in claim 15, wherein establishing and controlling said queue includes the step of controlling the placement of a mobile machine in said queue in response to said mobile machine approaching said queue.

24. A method, as set forth in claim 23, wherein controlling placement of said mobile machine includes the steps of:
  receiving a queue position request signal from said approaching mobile machine;
  responsively determining a queue position in said queue; and
  communicating said queue position to said approaching mobile machine.

25. A method, as set forth in claim 24, wherein communicating said queue position includes the step of communicating data disclosing the location of at least one entry point, and a determination of the number of mobile machines in said queue.

26. A method, as set forth in claim 15, including the step of allowing a mobile machine in a first position of said queue to access said service resource in response to a condition of said service resource.

27. A method, as set forth in claim 26, including the steps of:
  communicating a depart position signal to said mobile machine in response to determining to allow said queue to access said load point;
  receiving a leave position signal from said mobile machine upon departure of said mobile machine from said first position of said queue; and
  updating positions of other mobile machines in said queue in response to receiving said leave position signal.

28. A method, as set forth in claim 15, including the step of receiving an arrive service point signal from said mobile machine.

29. A method, as set forth in claim 15, including the step of enabling a first and a second mobile machine to access said resource simultaneously.

* * * * *